(12) United States Patent  
Schutt

(10) Patent No.: US 11,428,589 B2
(45) Date of Patent: Aug. 30, 2022

(54) DISPLACEMENT SENSOR UTILIZING RONCHI GRATING INTERFERENCE

(71) Applicant: SAF-HOLLAND, Inc., Muskegon, MI (US)

(72) Inventor: Randy L. Schutt, Holland, MI (US)

(73) Assignee: SAF-Holland, Inc., Muskegon, MI (US)

(*) Notice: Subject to any disclaimer, the term of this patent is extended or adjusted under 35 U.S.C. 154(b) by 10 days.

(21) Appl. No.: 16/160,452

(22) Filed: Oct. 15, 2018

(65) Prior Publication Data

US 2019/0113402 A1    Apr. 18, 2019

Related U.S. Application Data

(60) Provisional application No. 62/572,817, filed on Oct. 16, 2017.

(51) Int. Cl.
| | | |
|---|---|---|
| *G01L 1/24* | (2006.01) | |
| *G01G 1/00* | (2006.01) | |
| *G01L 1/22* | (2006.01) | |

(52) U.S. Cl.
CPC .................. *G01L 1/24* (2013.01); *G01G 1/00* (2013.01); *G01L 1/2206* (2013.01)

(58) Field of Classification Search
CPC .......... G01L 1/24; G01L 1/241; G01L 5/166; G01B 11/165; G01B 11/18; G01B 11/2513; G01B 11/2522; G01B 11/2536; G01G 19/12; G01G 3/125; G01G 23/361; G01G 23/375; B62D 53/12; B62D 53/08; B62D 53/0807; B62D 53/0885; B62D 53/0864

See application file for complete search history.

(56) References Cited

U.S. PATENT DOCUMENTS

| | | | |
|---|---|---|---|
| 2,787,834 A | | 4/1957 | Shoup |
| 2,886,717 A | | 5/1959 | Williamson et al. |
| 3,283,838 A | | 11/1966 | Fetterman et al. |
| 3,588,462 A | | 6/1971 | Kreckel et al. |
| 3,591,841 A | | 7/1971 | Wetzlar et al. |
| 3,628,866 A | | 12/1971 | Mueller |
| 3,661,220 A | | 5/1972 | Harris |
| 3,664,187 A | | 5/1972 | Goransson |
| 3,826,318 A | * | 7/1974 | Baumgartner ....... G01G 23/361 177/25.13 |
| 3,854,540 A | | 12/1974 | Holmstrom, Jr. |

(Continued)

FOREIGN PATENT DOCUMENTS

| | | |
|---|---|---|
| EP | 1199547 | 4/2002 |
| EP | 3379222 | 9/2018 |

(Continued)

*Primary Examiner* — Tran M. Tran
(74) *Attorney, Agent, or Firm* — Price Heneveld LLP

(57) ABSTRACT

A load cell to measure displacements transferred by a fifth wheel to the load cell includes an elongated mounting base portion configured to attach to a support structure of a tractor, a coupling portion configured to pivotally support a fifth wheel, a middle portion disposed above the elongated mounting base portion and below the coupling portion, the middle portion including a hollow interior section with an opening into the hollow interior section, and a post extending from the elongated mounting base portion and protruding into the hollow interior section of the middle portion.

27 Claims, 14 Drawing Sheets

(56) References Cited

U.S. PATENT DOCUMENTS

| | | | |
|---|---|---|---|
| 3,915,248 A | 10/1975 | Paelian | |
| 3,923,110 A * | 12/1975 | Dal Dan | G01G 3/02 177/210 R |
| 4,044,847 A | 8/1977 | Wu | |
| 4,047,585 A * | 9/1977 | Dlugos | G01G 3/08 177/210 R |
| 4,095,659 A * | 6/1978 | Blench | G01G 19/12 177/136 |
| 4,102,421 A * | 7/1978 | Ozaki | G01G 23/375 177/185 |
| 4,129,191 A * | 12/1978 | Kanning | G01G 3/08 177/210 R |
| 4,641,027 A * | 2/1987 | Renner | G01L 1/24 250/237 G |
| 4,666,003 A | 5/1987 | Reichow | |
| 4,712,000 A * | 12/1987 | Yoshikawa | H03M 1/308 250/205 |
| 4,722,600 A | 2/1988 | Chiang | |
| 4,920,806 A | 5/1990 | Obama et al. | |
| 4,921,059 A * | 5/1990 | Woodie, IV | G01G 3/1408 177/136 |
| 4,939,368 A | 7/1990 | Brown | |
| 5,060,965 A | 10/1991 | Haefner et al. | |
| 5,387,972 A * | 2/1995 | Janz | G01J 9/02 356/477 |
| 5,435,194 A | 7/1995 | Schedrat et al. | |
| 5,438,881 A | 8/1995 | Schedrat et al. | |
| 5,449,418 A | 9/1995 | Takagi et al. | |
| 5,489,983 A * | 2/1996 | McClenahan | G01B 11/2755 250/214 B |
| 5,490,430 A | 2/1996 | Anderson et al. | |
| 5,493,920 A | 2/1996 | Schedrat et al. | |
| 5,511,812 A | 4/1996 | Milner | |
| 5,526,702 A | 6/1996 | Schedrat et al. | |
| RE35,301 E | 7/1996 | Reichow | |
| 5,681,998 A | 10/1997 | Nakazaki et al. | |
| 5,714,832 A * | 2/1998 | Shirrod | A61B 1/227 310/328 |
| 5,777,240 A * | 7/1998 | Lefebvre | G01L 5/0019 177/229 |
| 5,811,738 A | 9/1998 | Boyovich et al. | |
| 5,847,832 A * | 12/1998 | Liskow | A61B 5/0064 356/613 |
| 5,883,312 A | 3/1999 | Hayashida | |
| 5,909,283 A * | 6/1999 | Eselun | G01D 5/38 356/499 |
| 5,929,388 A | 7/1999 | Uehara et al. | |
| 5,969,342 A | 10/1999 | Feng et al. | |
| 6,118,083 A | 9/2000 | Boyovich et al. | |
| 6,302,424 B1 | 10/2001 | Gisinger et al. | |
| 6,417,466 B2 * | 7/2002 | Gross | G01G 3/12 177/211 |
| 6,487,913 B2 | 12/2002 | Debesis et al. | |
| 6,494,102 B2 | 12/2002 | Hanisko | |
| 6,495,774 B1 | 12/2002 | Pederson | |
| 6,587,211 B1 | 7/2003 | Gelbart | |
| 6,619,134 B1 * | 9/2003 | Kinnunen | G01B 11/16 250/231.19 |
| 6,698,299 B2 | 3/2004 | Cripe | |
| 6,739,611 B2 | 5/2004 | Gisinger et al. | |
| 6,778,236 B1 | 8/2004 | Crawford et al. | |
| 6,804,012 B2 * | 10/2004 | Gombert | G01D 5/34 250/208.6 |
| 6,931,940 B2 | 8/2005 | Baudendistel | |
| 6,988,414 B2 | 1/2006 | Ruhrig et al. | |
| 6,991,239 B2 | 1/2006 | Schutt et al. | |
| 7,026,599 B2 * | 4/2006 | Gombert | G01L 5/166 250/221 |
| 7,044,492 B1 * | 5/2006 | Andersson | B62D 53/08 280/433 |
| 7,140,633 B2 * | 11/2006 | Audo | B60D 1/015 280/438.1 |
| 7,152,491 B2 | 12/2006 | Gloutsos et al. | |
| 7,159,890 B2 | 1/2007 | Craig et al. | |
| 7,202,425 B2 * | 4/2007 | Knudsen | G01G 3/12 177/211 |
| 7,214,893 B2 | 5/2007 | Sikula | |
| 7,289,228 B2 * | 10/2007 | Kitamura | G01B 11/16 250/208.6 |
| 7,430,491 B2 | 9/2008 | Gutierrez et al. | |
| 7,477,362 B2 | 1/2009 | Asundi et al. | |
| 7,538,281 B2 | 5/2009 | Pottebaum et al. | |
| 7,548,155 B2 | 6/2009 | Schutt et al. | |
| 7,913,569 B2 | 3/2011 | Girshovich et al. | |
| 8,243,024 B2 * | 8/2012 | Senft | G01D 5/34 250/239 |
| 8,342,557 B2 * | 1/2013 | Sibley, Jr. | B62D 53/0814 280/438.1 |
| 8,393,632 B2 | 3/2013 | Vortmeyer et al. | |
| 8,432,537 B2 | 4/2013 | Lam et al. | |
| 8,525,979 B2 | 9/2013 | Lam et al. | |
| 8,526,811 B2 * | 9/2013 | Xie | H04B 10/564 398/25 |
| 8,578,794 B2 | 11/2013 | Lee | |
| 8,720,931 B2 * | 5/2014 | Zaagman | B60D 1/015 280/438.1 |
| 8,793,081 B1 | 7/2014 | Loverich et al. | |
| 8,814,197 B2 * | 8/2014 | Keatley | B60D 1/015 280/433 |
| 8,841,566 B2 | 9/2014 | Reichow et al. | |
| 8,965,577 B2 * | 2/2015 | Arimitsu | G01L 5/166 700/258 |
| 8,966,998 B2 | 3/2015 | Gentner et al. | |
| 9,012,792 B2 * | 4/2015 | Gui | G01G 21/184 177/201 |
| 9,120,358 B2 | 9/2015 | Motts et al. | |
| 9,126,464 B2 * | 9/2015 | Zerba | B60D 1/015 |
| 9,151,686 B2 | 10/2015 | Barraco et al. | |
| 9,243,895 B2 | 1/2016 | Allen et al. | |
| 9,284,998 B2 | 3/2016 | Giessibl | |
| 9,347,845 B2 | 5/2016 | Giessibl | |
| 9,423,243 B1 | 8/2016 | Ikeda et al. | |
| 9,448,148 B2 * | 9/2016 | McCullough | G01B 11/245 |
| 9,645,022 B2 | 5/2017 | Brummel et al. | |
| 9,726,557 B2 | 8/2017 | Gianchandani et al. | |
| 9,981,512 B2 * | 5/2018 | Gentner | B60D 1/06 |
| 9,989,427 B2 * | 6/2018 | Teshigawara | G01L 5/166 |
| 10,151,652 B2 | 12/2018 | Giessibl | |
| 10,266,022 B2 * | 4/2019 | Zerba | B60D 1/24 |
| 10,337,908 B2 * | 7/2019 | Reichow | G01G 3/1412 |
| 10,406,872 B2 * | 9/2019 | Scheips | G01L 1/14 |
| 10,479,151 B2 * | 11/2019 | Brinkmann | B60D 1/06 |
| 10,488,281 B2 * | 11/2019 | Burrow | G01L 1/2262 |
| 10,816,388 B2 * | 10/2020 | Juřik | G01G 3/12 |
| 10,823,603 B2 * | 11/2020 | Johnson | G01G 3/14 |
| 2008/0168844 A1 | 7/2008 | Lequesne et al. | |
| 2009/0090566 A1 | 4/2009 | Ruth et al. | |
| 2015/0226601 A1 | 8/2015 | Perrea et al. | |
| 2017/0241828 A1 | 8/2017 | Reichow et al. | |
| 2019/0084362 A1 | 3/2019 | Sielhorst et al. | |
| 2019/0113402 A1 | 4/2019 | Schutt | |

FOREIGN PATENT DOCUMENTS

| | | |
|---|---|---|
| GB | 2242518 A | 10/1991 |
| WO | 20181518 | 8/2018 |

\* cited by examiner

DISPLACEMENT SENSOR UTILIZING
RONCHI GRATING INTERFERENCE

CROSS-REFERENCE TO RELATED APPLICATIONS

This application claims the benefit of U.S. Provisional Patent Application No. 62/572,817, filed on Oct. 16, 2017, entitled "DISPLACEMENT SENSOR UTILIZING RONCHI GRATING INTERFERENCE," the entire disclosure of which is incorporated herein by reference.

BACKGROUND OF THE INVENTION

A fifth wheel imparts forces that displace the mounting apparatus pivotally supporting the fifth wheel onto a support structure of a trailer. An apparatus is needed to measure the displacement.

BRIEF SUMMARY OF THE INVENTION

In a first aspect of the disclosure, a load cell to measure displacements transferred by a fifth wheel to the load cell includes: an elongated mounting base portion configured to attach to a support structure of a tractor, a coupling portion configured to pivotally support a fifth wheel, a middle portion disposed above the elongated mounting base portion and below the coupling portion, the middle portion including a hollow interior section with an opening into the hollow interior section, and a post extending from the elongated mounting base portion and protruding into the hollow interior section of the middle portion.

Variations of the first aspect of the disclosure can include any of the following features:
  the coupling portion includes an aperture with a centerline;
  the post is disposed between the centerline and the elongated mounting base portion;
  the hollow interior section is disposed between the centerline and the elongated mounting base portion;
  the post has a vertical centerline;
  the vertical centerline and the centerline of the aperture of the coupling portion intersect at an orthogonal angle;
  a first optical array sensor attached to the post within the hollow interior section;
  a first immobile grating film applied over the first optical array sensor;
  a first light source disposed within the hollow interior section;
  a first mobile grating film interconnected with the middle portion within the hollow interior section;
  the first light source emits light that transmits through the first mobile grating film, then through the first immobile grating film, and then to the first optical array sensor;
  a second optical array sensor attached to the post within the hollow interior section;
  a second immobile grating film applied over the second optical array sensor;
  a second light source disposed within the hollow interior section;
  a second mobile grating film interconnected with the middle portion within the hollow interior section;
  the second light source emits light that transmits through the second mobile grating film, then through the second immobile grating film, and then to the second optical array sensor;
  a third optical array sensor attached to the post within the hollow interior section;
  a third immobile grating film applied over the third optical array sensor;
  a third light source disposed within the hollow interior section;
  a third mobile grating film interconnected with the middle portion within the hollow interior section;
  the third light source emits light that transmits through the third mobile grating film, then through the third immobile grating film, and then to the third optical array sensor;
  the first optical array sensor, the second optical array sensor, and the third optical array sensor all produce output voltages;
  the output voltages of the first optical array sensor vary primarily as a function of vertical displacement of the middle portion relative to the post;
  the output voltages of the second optical array sensor vary primarily as a function of lateral displacement of the middle portion relative to the post; and
  the output voltages of the third optical array sensor vary primarily as a function of longitudinal displacement of the middle portion relative to the post.

These and other features, advantages, and objects of the embodiments disclosed herein will be further understood and appreciated by those skilled in the art by reference to the following specification, claims, and appended drawings.

DETAILED DESCRIPTION

For purposes of description herein, the terms "below," "upward," "forward," "above," and derivatives thereof, shall relate to the disclosure as oriented in FIG. 1, where certain relative terms such as lateral, longitudinal, and vertical are explicitly illustrated. However, it is to be understood that the disclosure may assume various alternative orientations, except where expressly specified to the contrary. It is also to be understood that the specific devices and processes illustrated in the attached drawings, and described in the following specification, are exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
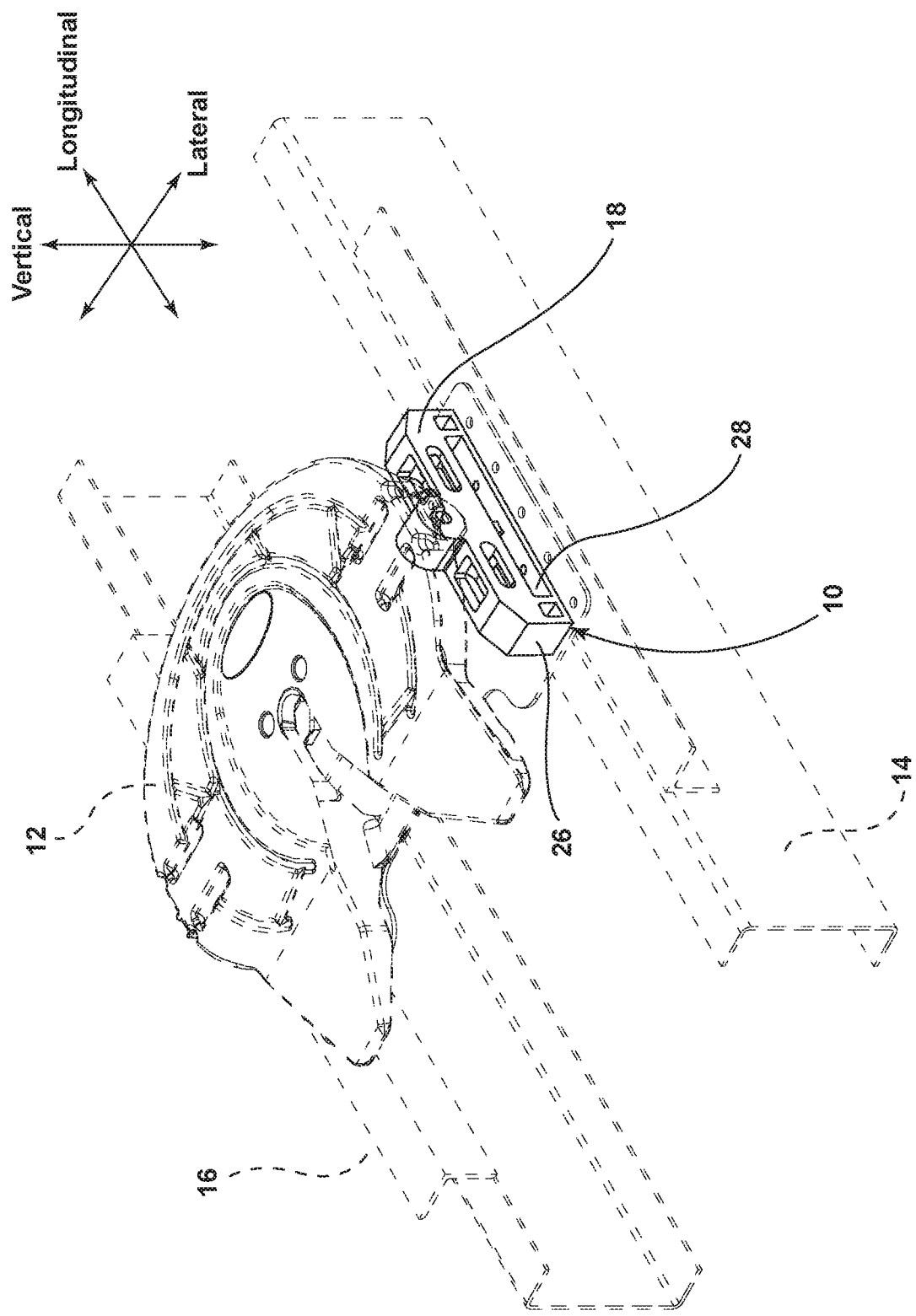
FIG. 1 is a perspective view of a load cell show in context attached to a support structure of a trailer and pivotally supporting a fifth wheel.
Figure 2:
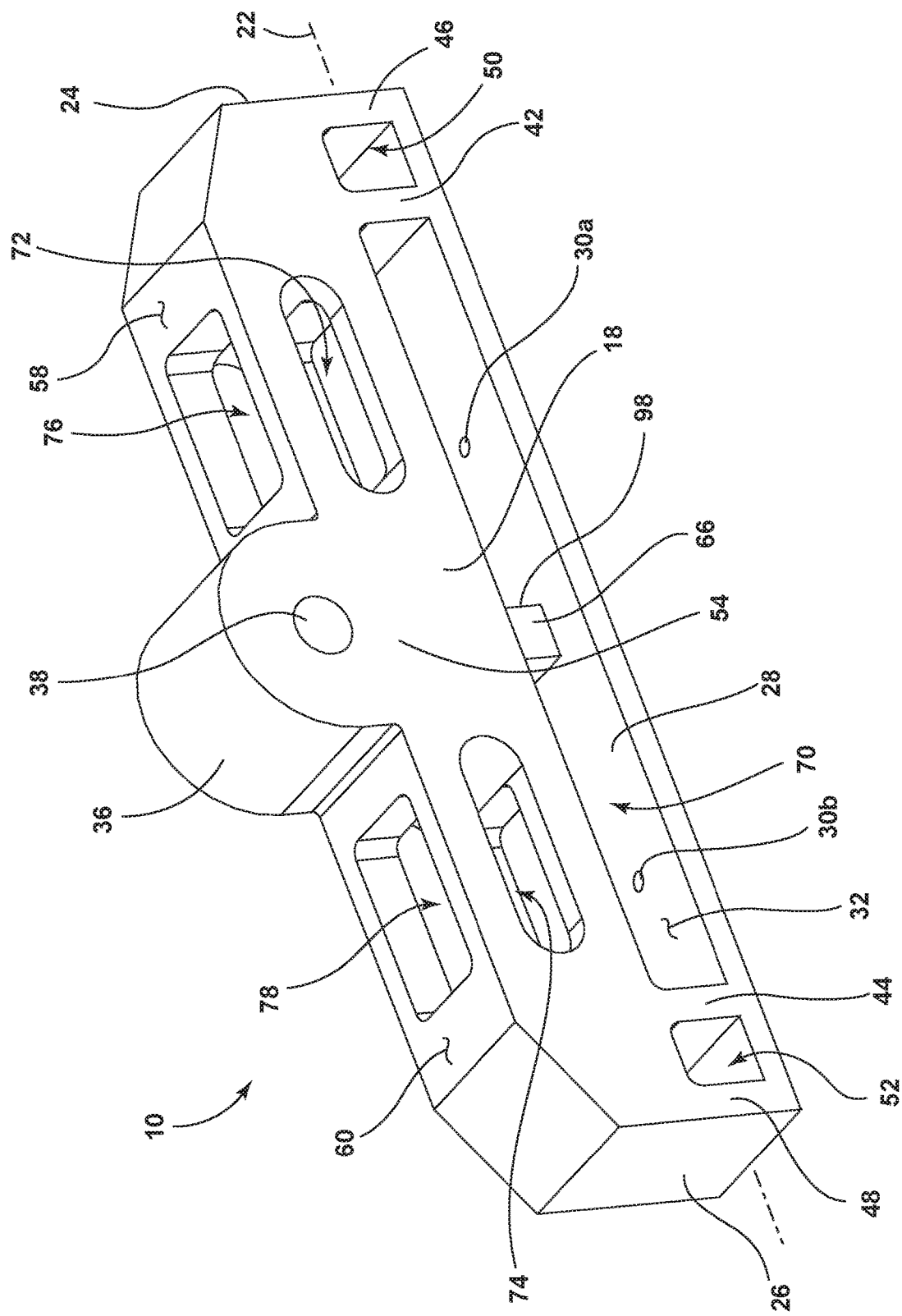
FIG. 2 is a perspective view of the load cell of FIG. 1, illustrating a middle portion between an elongated mounting base portion and a coupling portion.
Figure 3:
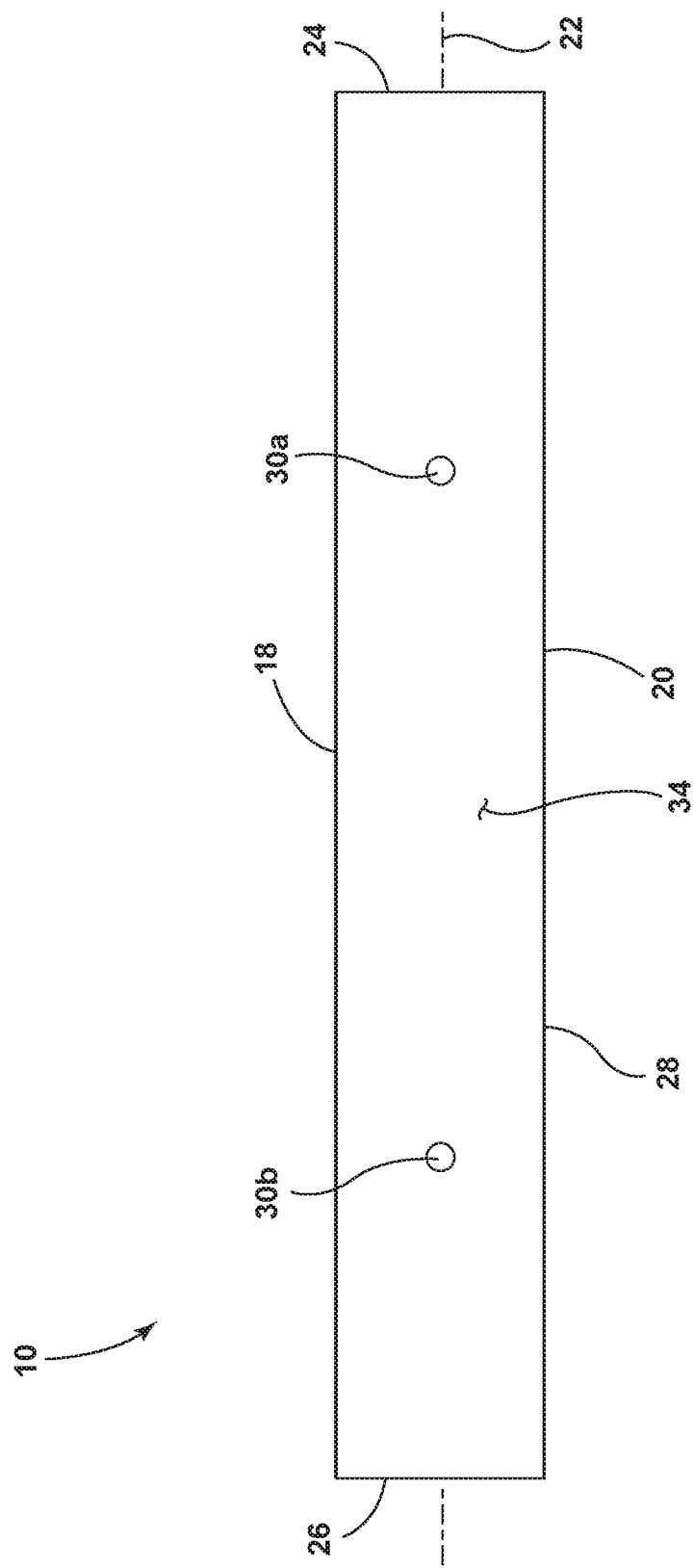
FIG. 3 is a bottom view of the load cell of FIG. 1, illustrating several apertures accessible from a planar bottom surface of the elongated mounting base portion.
Figure 4:
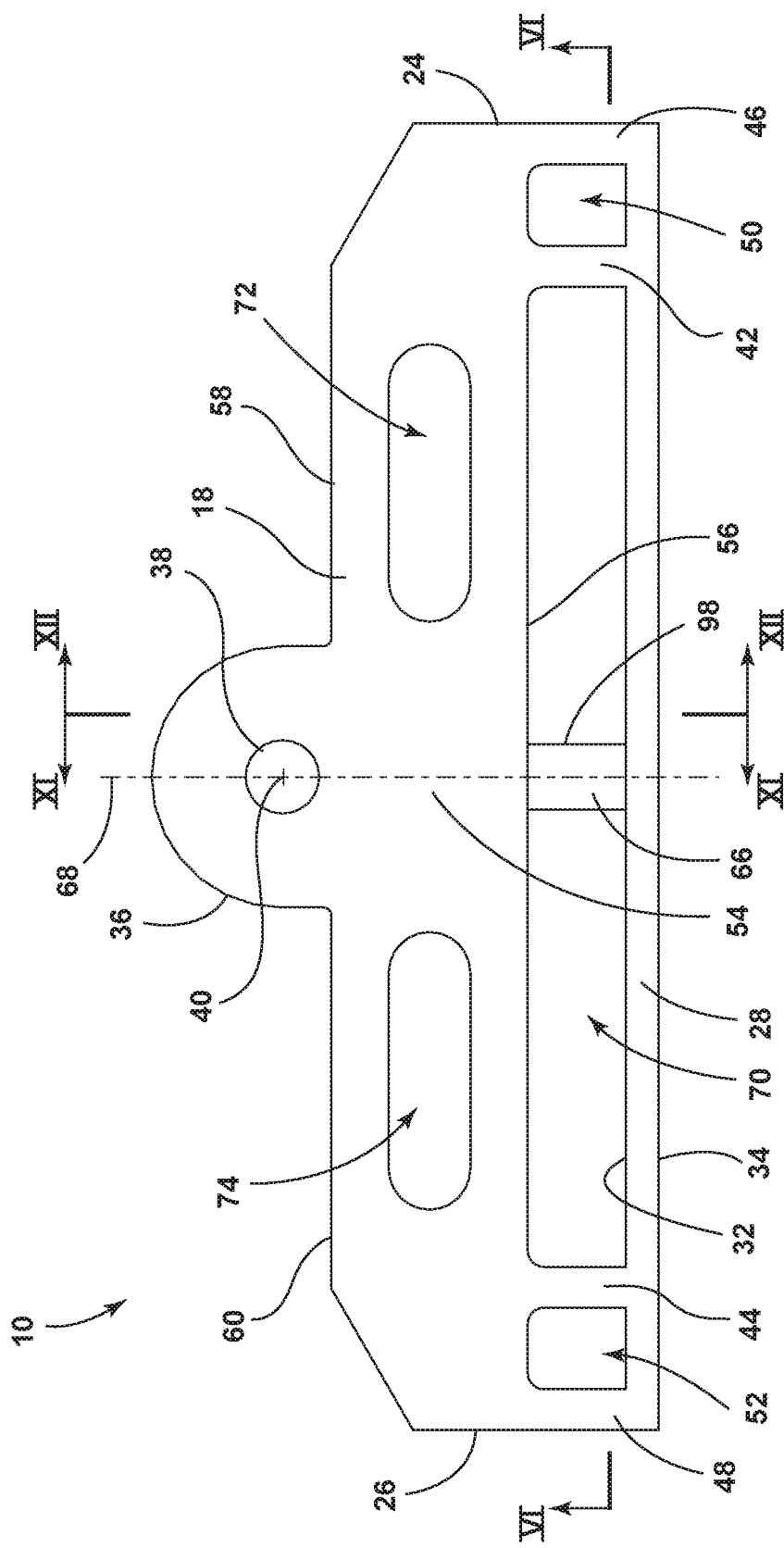
FIG. 4 is a side view of the load cell of FIG. 1, illustrating a first interior column and a second interior column extending vertically upward from the elongated mounting base portion.
Figure 5:
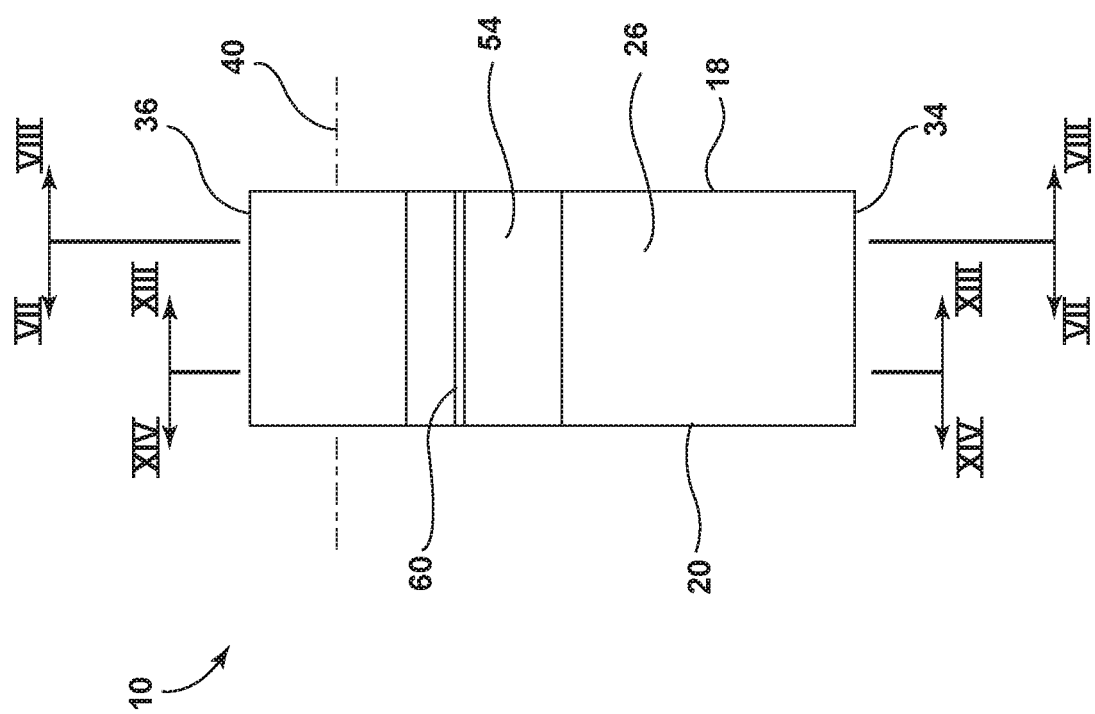
FIG. 5 is a front view of the load cell of FIG. 1, illustrating a centerline of an aperture of the coupling portion, a first lateral side, and a second lateral side.
Figure 6:
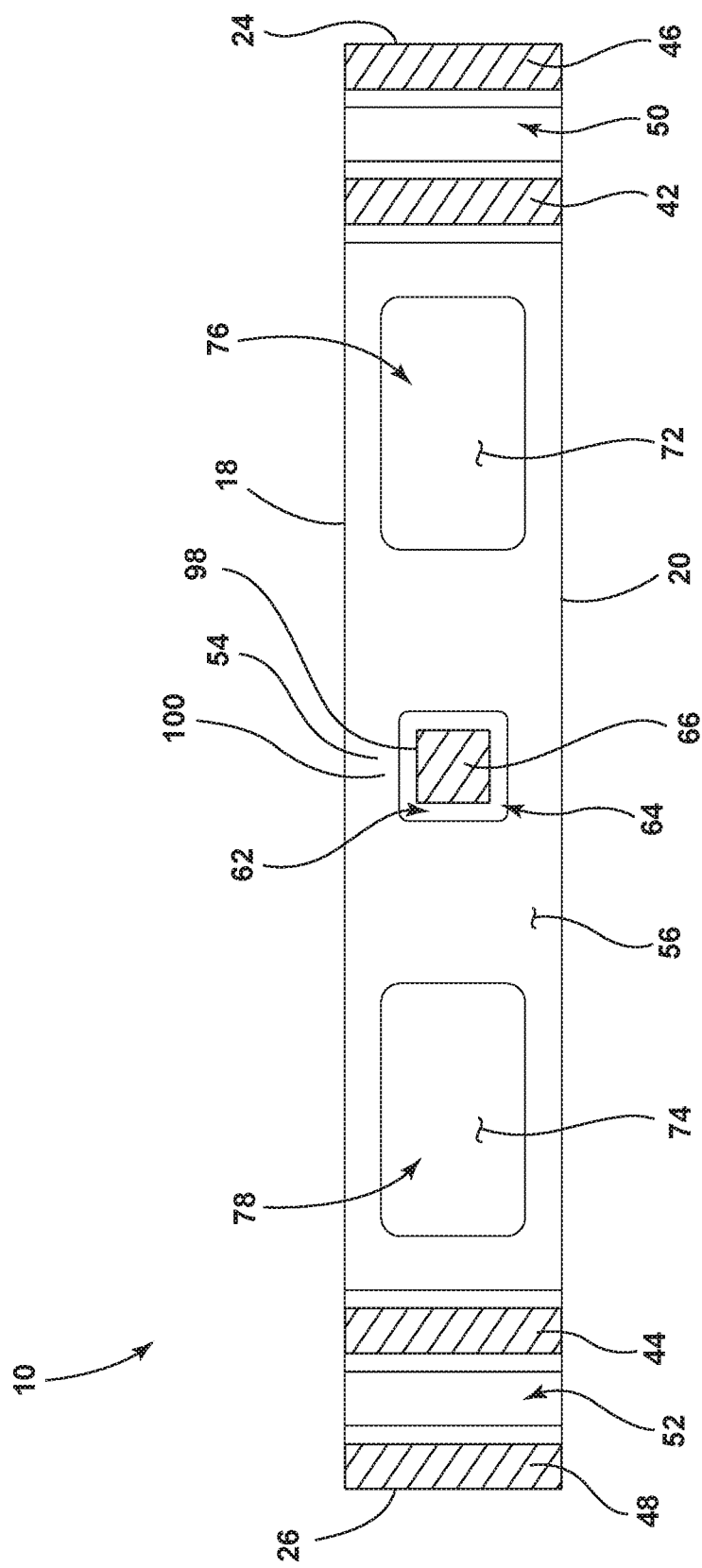
FIG. 6 is bottom view of the cross-section of the load cell of FIG. 1 taken through lines VI-VI of FIG. 4, illustrating a hollow interior section in the middle portion.

Referring to FIG. 1, a load cell 10 to measure displacements transferred by a fifth wheel 12 is illustrated in context, with the load cell 10 supported by a support structure 14 (e.g., a frame rail) attached to a tractor or semi-truck (not shown) and the load cell 10 pivotally supporting the fifth wheel 12. A second load cell (not shown), identical in all respects to the load cell 10, may be supported by another support structure 16 (e.g., another frame rail). The second load cell may be pivotally supporting the fifth wheel 12. As will be explained below, the load cell 10 utilizes one or more optical array sensors and Ronchi grating films to determine displacements.

Referring generally to FIGS. 2-14, the load cell 10 includes a first lateral side 18 and a second lateral side 20 on the opposite side of the load cell 10 as the first lateral side 18. The load cell 10 further comprises a longitudinal midline 22 between the first lateral side 18 and the second lateral side 20. The load cell 10 further comprises a first longitudinal side 24 and a second longitudinal side 26 on the opposite side of the load cell 10 as the first longitudinal side 24.

The load cell 10 includes an elongated mounting base portion 28. The elongated mounting base portion 28 is configured to attach to the support structure 14 of the tractor. For example, the elongated mounting base portion 28 may comprise mounting apertures 30a and 30b spaced to match apertures (not shown) disposed on the support structure 14, through which a fastener (not shown) can extend, thus allowing the attachment of the elongated mounting base portion 28 to the support structure 14. The elongated mounting base portion 28 further includes a planar top surface 32 and a planar bottom surface 34 parallel to and below the planar top surface 32. The mounting apertures 30a and 30b extend through the elongated mounting base portion 28 from the planar top surface 32 to the planar bottom surface 34.

The load cell 10 further includes a coupling portion 36. The coupling portion 36 is configured to pivotally support the fifth wheel 12. For example, the coupling portion 36 includes an aperture 38, which is positioned to match an aperture (not shown) on the fifth wheel 12 and through which a pin or fastener (not shown) can extend to couple the coupling portion 36 and the fifth wheel 12. The aperture 38 has a centerline 40 (see, e.g., FIGS. 4 and 5), which represents the axis about which the fifth wheel 12 pivots. The aperture 38 extends through the coupling portion 36 from the first lateral side 18 through to the second lateral side 20.

The load cell 10 further includes a first interior column 42 and a second interior column 44. The first interior column 42 is disposed near the first longitudinal side 24 of the load cell 10. The first interior column 42 extends laterally from the first lateral side 18 to the second lateral side 20 of the load cell 10. The first interior column 42 extends vertically upward from the elongated mounting base portion 28. The second interior column 44 is disposed near the second longitudinal side 26 of the load cell 10. The second interior column 44 extends laterally from the first lateral side 18 to the second lateral side 20 of the load cell 10. The second interior column 44 extends vertically upward from the elongated mounting base portion 28.

The load cell 10 further includes a first edge column 46. The first edge column 46 terminates with the first longitudinal side 24. In other words, the forward longitudinal surface of the first edge column 46 is the first longitudinal side 24. The first edge column 46 is disposed near the first interior column 42. The first edge column 46 extends laterally from the first lateral side 18 to the second lateral side 20. The first edge column 46 extends vertically upward from the elongated mounting base portion 28.

The load cell 10 further includes a second edge column 48. The second edge column 48 terminates with the second longitudinal side 26. In other words, the rearward longitudinal surface of the second edge column 48 is the second longitudinal side 26. The second edge column 48 is disposed near the second interior column 44. The second edge column 48 extends laterally from the first lateral side 18 to the second lateral side 20. The second edge column 48 extends vertically upward from the elongated mounting base portion 28.

The load cell 10 further includes a first edge void space 50 and a second edge void space 52. The first edge void space 50 extends from the first lateral side 18 through to the second lateral side 20 and is disposed between the first edge column 46 and the first interior column 42. The second edge void space 52 extends from the first lateral side 18 through to the second lateral side 20 and is disposed between the second edge column 48 and the second interior column 44.

The load cell 10 further includes a middle portion 54 disposed above the elongated mounting base portion 28 and below the coupling portion 36. The middle portion 54 includes a planar bottom surface 56. The planar bottom surface 56 is parallel to the planar top surface 32 of the elongated mounting base portion 28. The planar bottom surface 56 extends longitudinally from the first interior column 42 to the second interior column 44. In other words, the first interior column 42 and the second interior column 44 are disposed between the planar bottom surface 56 of the middle portion 54 and the planar top surface 32 of the elongated mounting base portion 28. The planar bottom surface 56 extends laterally from the first lateral side 18 to the second lateral side 20.

The middle portion 54 further includes a first planar top surface 58 and a second planar top surface 60. The first planar top surface 58 is disposed between the first longitudinal side 24 and the coupling portion 36. The first planar top surface 58 is parallel to the planar bottom surface 56 of the middle portion 54. The second planar top surface 60 is disposed between the second longitudinal side 26 and the coupling portion 36. The second planar top surface 60 is parallel to the planar bottom surface 56 of the middle portion 54.

The middle portion 54 further includes a hollow interior section 62. The middle portion 54 further includes an opening 64 into the hollow interior section 62. The hollow interior section 62 is disposed between the centerline 40 of the aperture 38 of the coupling portion 36 and the elongated mounting base portion 28.

The load cell 10 further includes a post 66 that extends vertically from the elongated mounting base portion 28. More specifically, in this embodiment, the post 66 extends orthogonally vertically from the planar top surface 32 of the elongated mounting base portion 28. The post 66 protrudes into the hollow interior section 62 of the middle portion 54. The post 66 is disposed between the centerline 40 of the aperture 38 of the coupling portion 36 and the elongated mounting base portion 28. The post 66 has a vertical centerline 68. The vertical centerline 68 of the post 66 and the centerline 40 of the aperture 38 of the coupling portion 36 intersect at an orthogonal angle. The purpose of the post 66 is discussed further below.

The load cell 10 further includes a middle void space 70. The middle void space 70 extends from the first lateral side 18 through to the second lateral side 20, except for the post 66. In other words, the post 66 extends up through the middle void space 70. The middle void space 70 is disposed between the first interior column 42 and the second interior column 44.

The middle portion 54 further includes a first lateral void space 72. The first lateral void space 72 is disposed longitudinally between the first longitudinal side 24 and the hollow interior section 62. The first lateral void space 72 is disposed vertically between the first planar top surface 58 and the planar bottom surface 56 of the middle portion 54. The first lateral void space 72 extends laterally from the first lateral side 18 through to the second lateral side 20.

The middle portion 54 further includes a second lateral void space 74. The second lateral void space 74 is disposed longitudinally between the second longitudinal side 26 and hollow interior section 62. The second lateral void space 74 is disposed vertically between the second planar top surface 60 and the planar bottom surface 56 of the middle portion 54. The second lateral void space 74 extends laterally from the first lateral side 18 through to the second lateral side 20.

The middle portion 54 further includes a first vertical void space 76. The first vertical void space 76 is disposed longitudinally between the first longitudinal side 24 and the hollow interior section 62. The first vertical void space 76 extends vertically from the planar bottom surface 56 of the middle portion 54 through to the first planar top surface 58. The first vertical void space 76 is contiguous with the first lateral void space 72.

The middle portion 54 further includes a second vertical void space 78. The second vertical void space 78 is disposed longitudinally between the second longitudinal side 26 and the hollow interior section 62. The second vertical void space 78 extends vertically from the planar bottom surface 56 of the middle portion 54 through to the first planar top surface 58. The second vertical void space 78 is contiguous with the second lateral void space 74.

The first vertical void space 76, the first lateral void space 72, the first edge void space 50, the middle void space 70, the second edge void space 52, the second lateral void space 74, and the second vertical void space 78 all serve to isolate the displacement forces that the fifth wheel 12 imparts on the load cell 10, such that the displacement forces can be converted into component displacements (lateral, longitudinal, and vertical) with as little cross-talk as possible. During use, the post 66, extending from the elongated mounting base portion 28, which is attached to the support structure 14, remains relatively motionless, while remainder of the load cell 10, especially the middle portion 54 surrounding the hollow interior section 62, is displaced in the lateral, longitudinal, and vertical directions. Measuring the amount of displacement of the middle portion 54 relative to the post 66, is now discussed.

Figure 7:
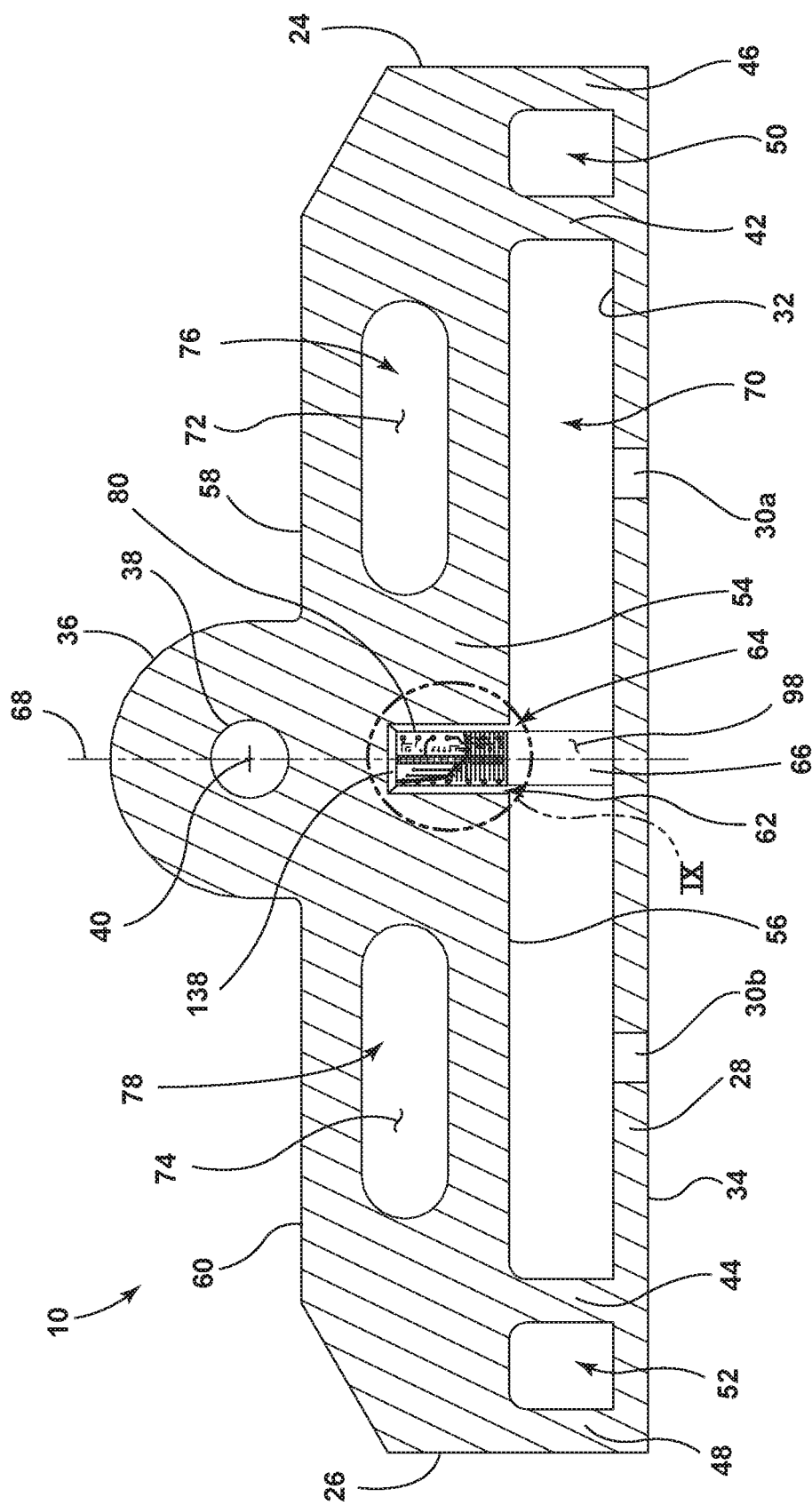
FIG. 7 is a side view of the cross-section of the load cell of FIG. 1 taken through lines VII-VII of FIG. 5, illustrating the post extending into the hollow interior section.
Figure 8:
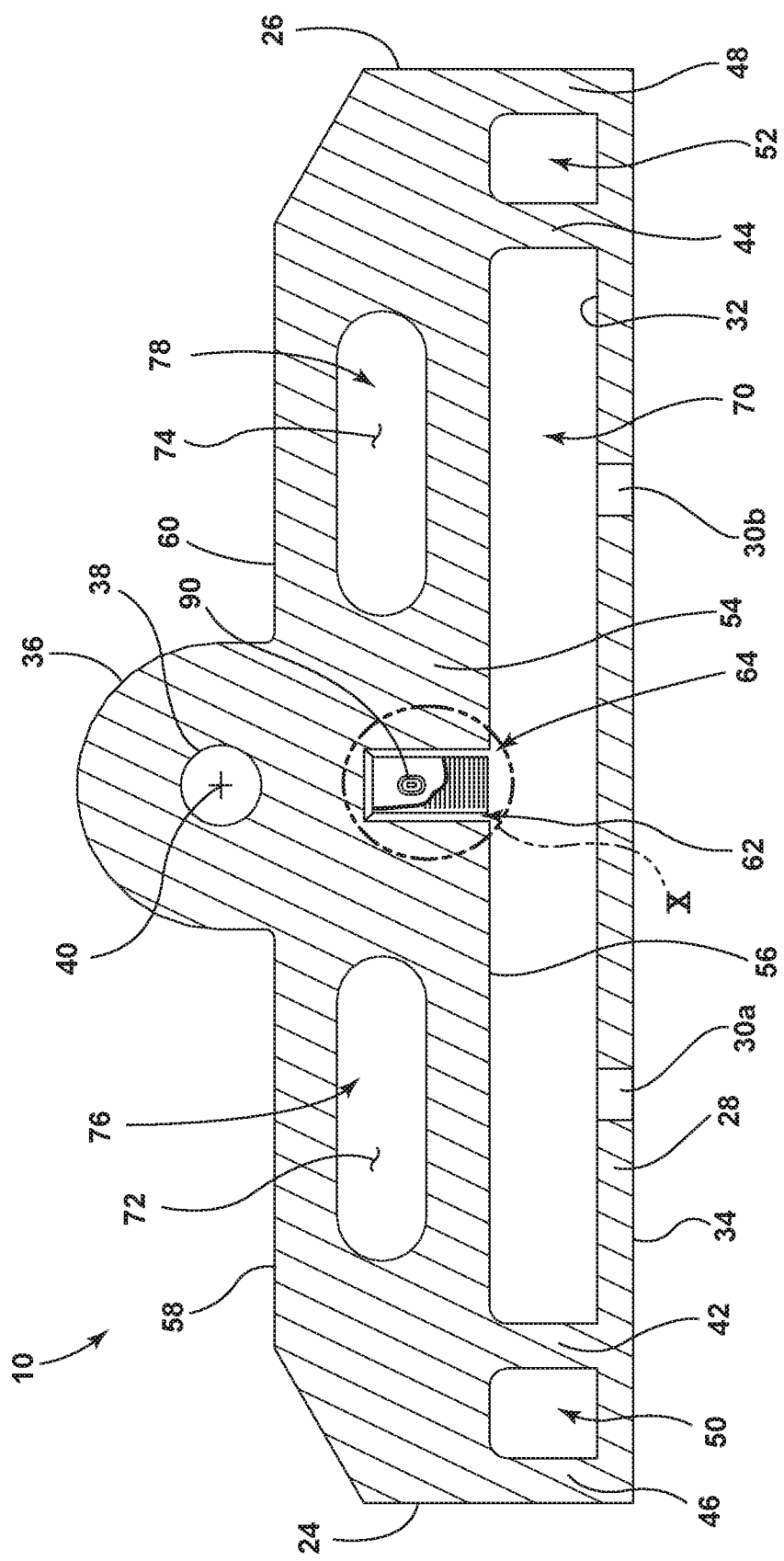
FIG. 8 is a side view of the cross-section of the load cell of FIG. 1 taken through VIII-VIII of FIG. 5, illustrating a first light source attached to the middle portion.
Figure 9:
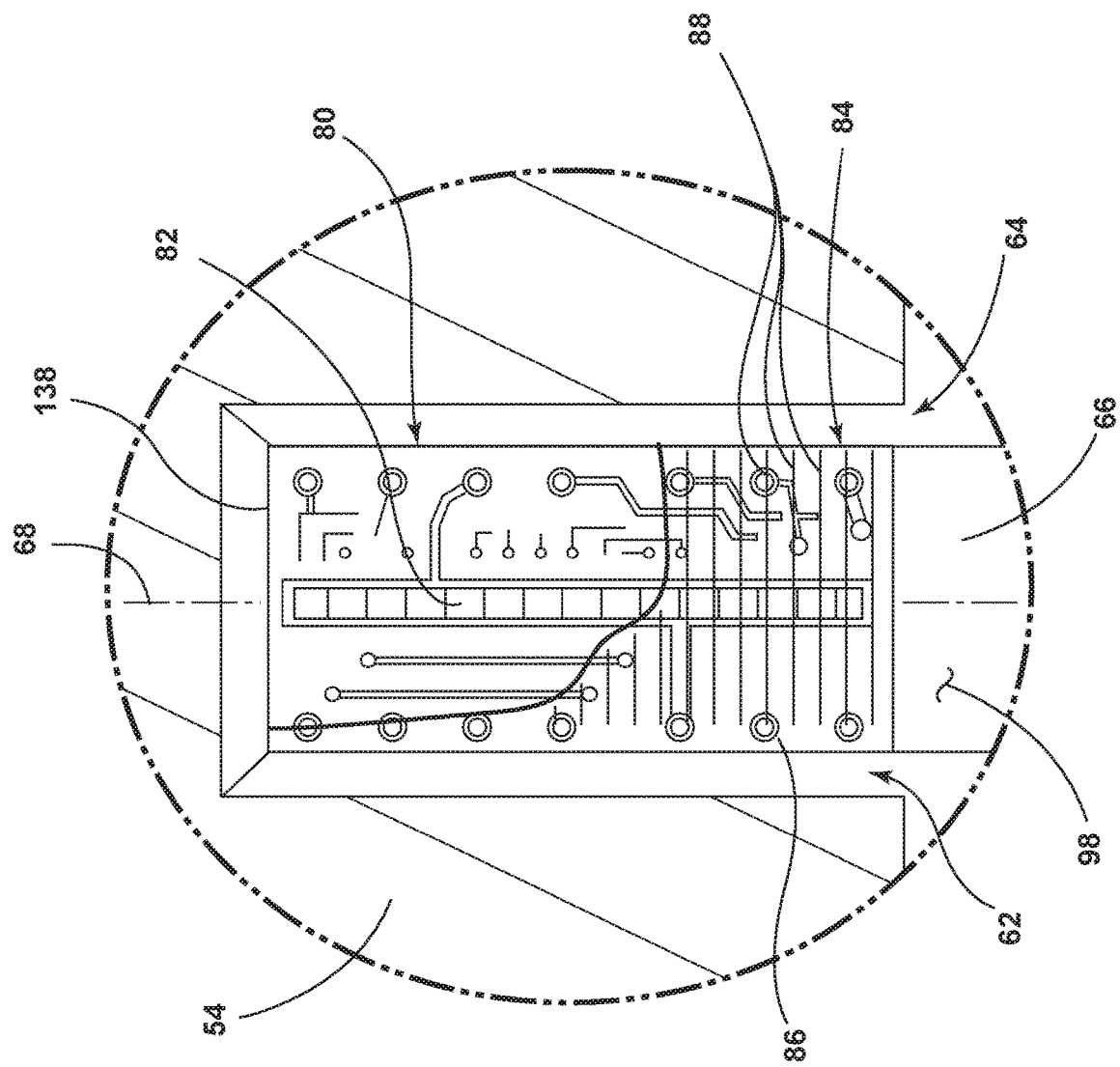
FIG. 9 is a side magnified view of the post of the load cell of FIG. 1 from callout IX of FIG. 7, illustrating a first optical array sensor attached to a first surface.
Figure 10:
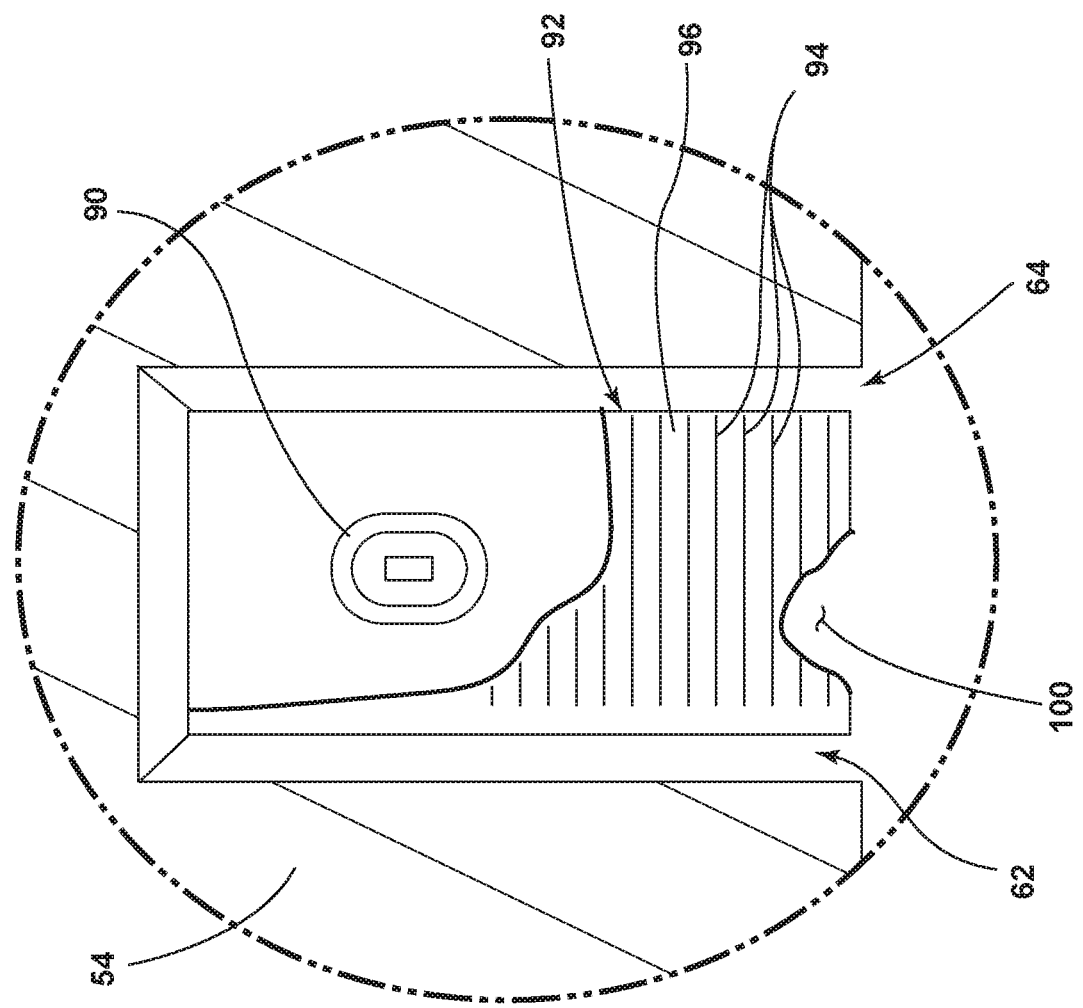
FIG. 10 is a side magnified view of the hollow interior section of the load cell of FIG. 1 from the callout VII of FIG. 8, illustrating a first light source attached to a first surface of the middle portion.
Figure 11:
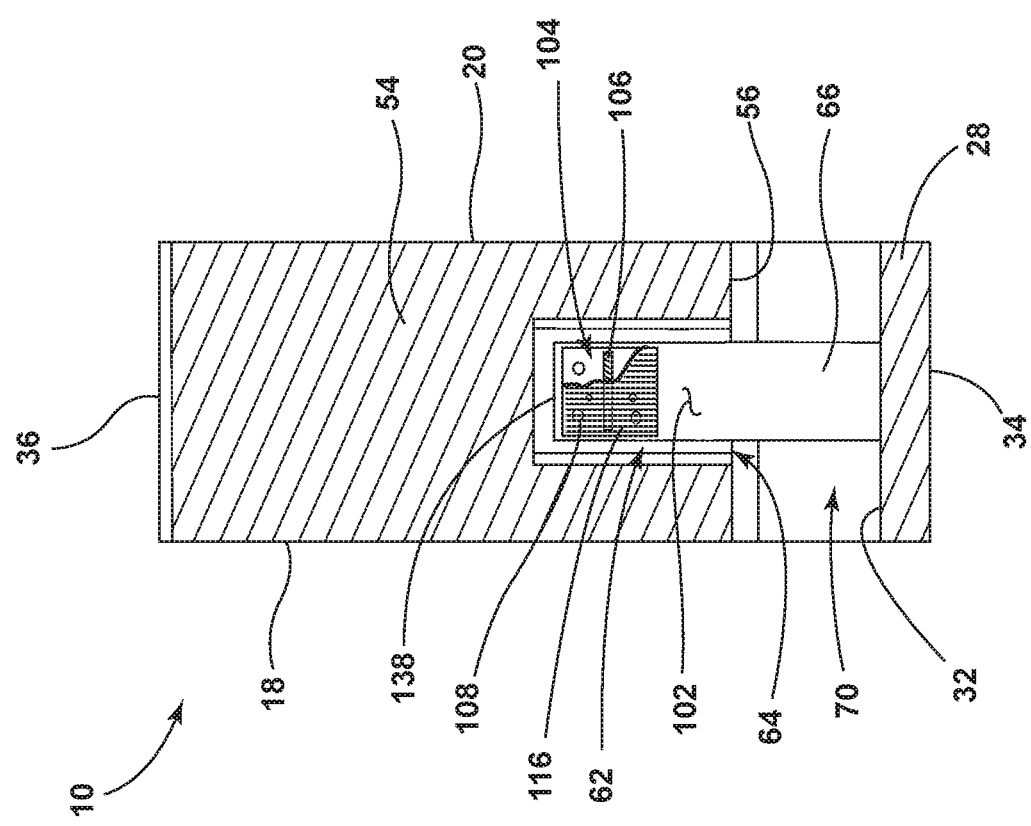
FIG. 11 is a front view of the cross-section of the load cell of FIG. 1 taken through lines XI-XI of FIG. 4, illustrating a second optical array sensor attached to a second surface of the post.

The load cell 10 further comprises a first optical array sensor 80 (see particularly FIGS. 7 and 9). An example of such an optical array sensor is the IC linear sensor array 256X1, part number TSL1402-R-ND, manufactured by AMS, however, other optical array sensors suitable for the applications as disclosed herein may also be utilized. An optical sensor array can include an array of photodiodes, each the size of one pixel, and each producing an output voltage that depends on the intensity of light impinging upon the photodiode. The greater the light intensity reaching the photodiode, the greater the output voltage. The first optical array sensor 80 is attached to the post 66 within the hollow interior section 62 of the middle portion 54. In this embodiment, the first optical array sensor 80 includes an array of photodiodes 82 that are arranged vertically. In other embodiments, individual photo diodes, phot resistive elements, or other optical sensors may be utilized.

The load cell 10 further includes a first immobile grating film 84 applied over the first optical array sensor 80. The first immobile grating film 84 is "immobile" in the sense that it is interconnected with the post 66, which, as described above, is designed to be relatively stationary while the fifth wheel 12 is imparting forces to the load cell 10. The first immobile grating film 84, like all other grating films discussed below, comprises a transparent film 86 with evenly spaced grid of lines 88 printed thereon. An incoming light ray (not shown) that encounters one of the lines of the grid of lines 88 either bounces off the line or is absorbed. An incoming light ray that encounters the transparent film 86 between the lines transmits through the transparent film 86 and encounters the object under the film 86, here, the first optical array sensor 80, including a photodiode 82 included thereon. The transparent film 86 with the grid of lines 88 is sometimes referred to as a Ronchi grid or a Ronchi grating.

The load cell 10 further includes a first light source 90 (see particularly FIGS. 8 and 10) disposed within the hollow interior section 62. The first light source 90, as well as any other light source mentioned herein, can be an LED, a light bar, a filament bulb, among other options.

The load cell 10 further includes a first mobile grating film 92 interconnected with the middle portion 54 within the hollow interior section 62. In this embodiment, the first mobile grating film 92 is applied over the first light source 90. The first mobile grating film 92 is "mobile" in the sense that it is not attached to the post 66, but rather to the middle portion 54 within the hollow interior section 62, which moves as a result of the forces applied to the load cell 10 from the fifth wheel 12. The first mobile grating film 92 is similar to the first immobile grating film 84 in that the first mobile grating film 92 likewise comprises a grid of lines 94 printed on a transparent film 96. The number of lines and the spacing of the lines of the grid of lines 94 on the first mobile grating film 92 will differ from the number of lines and the spacing of the lines of the grid of lines 88 on the first immobile grating film 84.

The first light source 90 emits light (not shown) towards the first optical array sensor 80. The light transmits through the first mobile grating film 92, then through the first immobile grating film 84, and then to the first optical array sensor 80. The first mobile grating film 92 and the first immobile grating film 84 cooperate to vary the intensity of the light emitted by the first light source 90 that the first optical array sensor 80 perceives. One photodiode 82 receives light of a certain intensity and an adjacent photodiode 82 may receive light of an intensity of a greater or lesser magnitude. The first mobile grating film 92 and the first immobile grating film 84 can cause the first optical array sensor 80 to perceive an interference pattern, greater light intensity changing to lesser light intensity changing to greater light intensity, as a function of position along the first optical array sensor 80, or numerous such patterns occurring at a regular interval (called "frequency"). Each photodiode 82 outputs a voltage reflecting this light intensity, and the light intensity varies as a function of position along the first optical array sensor 80. The output voltage that each photodiode 82 outputs can be recorded and manipulated. As the fifth wheel 12 imparts a force and displaces the middle portion 54 of the load cell 10 relative to the post 66, the first mobile grating film 92 moves relative to the first immobile grating film 84, altering the intensity of light that each photodiode 82 of the first optical array sensor 80 perceives and, thus, altering the output voltage of each photodiode 82. The change in the output voltage is proportional to the magnitude of the displacement. That is, the magnitude of the movement of the middle portion 54 is relative to the post 66. As mentioned above, both the first immobile grating film 84 and the first mobile grating film 92 include a grid of lines 88, 94 respectively. In this embodiment, both the grid of lines 88 of first immobile grating film 84 and the grid of lines 94 of the first mobile grating film 92 are arranged horizontally, while, as mentioned, the photodiodes 82 of the first optical sensor array 80 are arranged vertically. However, in other embodiments, (not shown) either the grid of lines 88 of the first immobile grating film 84 or the grid of lines 94 of the first mobile grating film 92 are arranged horizontally while the other grid of lines 88 or 94 are arranged other than horizontally (such as diagonally).

The post 66 further includes a first surface 98 (see particularly FIGS. 7 and 9). The first surface 98 of the post 66 forms a plane parallel with the longitudinal midline 22 of the load cell 10. The first surface 98 of the post 66 faces the middle portion 54. The middle portion 54 likewise includes a first surface 100 (see particularly FIG. 10). The first surface 100 of the middle portion 54 likewise forms a plane parallel with a longitudinal midline 22 of the load cell 10 and thus is parallel with the first surface 98 of the post 66. The first surface 98 of the middle portion 54 is accessible from the hollow interior section 62. The first surface 100 of the middle portion 54 faces the first surface 98 of the post 66. The first optical array sensor 80 is affixed to the first surface 98 of the post 66. The first light source 90 is affixed to the first surface 100 of the middle portion 54. The first immobile grating film 84, covering the first optical array sensor 80 on the first surface 98 of the post 66, faces the first mobile grating film 92, which is covering the first light source 90. In an alternative embodiment (not shown), the first light source 90 is placed on the first surface 98 of the post 66 adjacent the first optical array sensor 80, and the first mobile grating film 92 is affixed directly to the first surface 100 of the middle portion 54 (which first surface 100 is a reflective surface). The first light source 90 emits light, which either is absorbed by a line of the grid of lines 94 of the first mobile grating film 92 or is reflected off the first surface 100 of the middle portion 54. Light reflected off the first surface 100 of the middle portion 54 is then either absorbed by a line of the grid of lines 88 of the first immobile grating film 84 or transferred through the transparent film 86 and perceived by a photodiode 82 of the first optical array sensor 80. The first mobile grating film 92 and the first immobile grating film 84 affect the light emitted by the first light source 90 in the same manner, as described above, and the photodiodes 82 of the first optical array sensor 80 produce an output voltage as a function of light intensity, which changes as the force of the fifth wheel 12 moves the first mobile grating film 92 relative to the first immobile grating film 84.

The post 66 further includes a second surface 102 (see particularly FIG. 11), which forms a plane parallel with the centerline 40 of the aperture 38 of the coupling portion 36. In other words, the centerline 40 of the aperture 38 of the coupling portion 36 is in the lateral direction and the plane formed by the second surface 102 is also laterally disposed. The load cell 10 further includes a second optical array sensor 104. The second optical array sensor 104 is also attached to the post 66 within the hollow interior section 62 of the middle portion 54. In this embodiment, the second optical array sensor 104 is affixed to the second surface 102 of the post 66. In this embodiment, the second optical array sensor 104 includes an array of photodiodes 106 that are arranged laterally. That is, horizontally across the post 66. The load cell 10 further includes a second immobile grating film 108 applied over the second optical array sensor 104.

Figure 12:
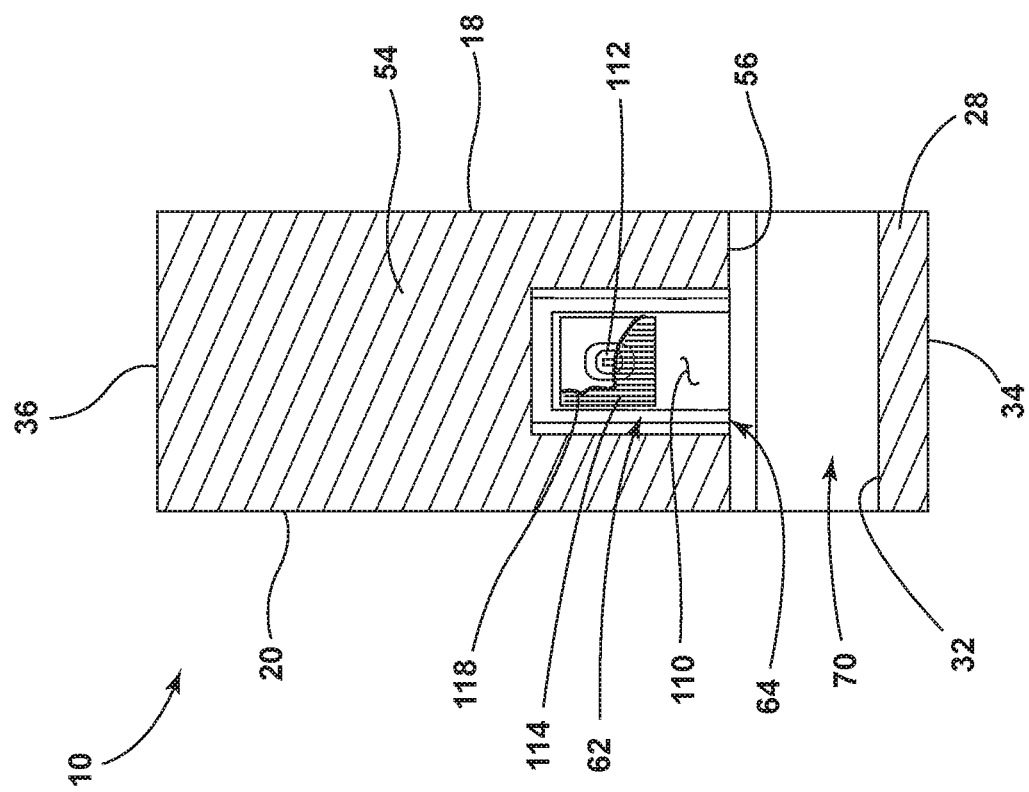
FIG. 12 is a rear view of the cross-section of the load cell of FIG. 1 taken through lines XII-XII of FIG. 4, illustrating a second light source attached to a second surface of the middle portion.

The middle portion 54 of the load cell 10 further includes a second surface 110 (see particularly FIG. 12). The second surface 110 also forms a plane parallel with the centerline 40 of the aperture 38 of the coupling portion 36. The second surface 110 is accessible from the hollow interior section 62 and thus faces the post 66, specifically the second surface 102 of the post 66. The load cell 10 further includes a second light source 112 disposed within the hollow interior section 62. In this embodiment, the second light source 112 is affixed to the second surface 110 of the middle portion 54. The load cell 10 further includes a second mobile grating film 114 interconnected with the middle portion 54 within the hollow interior section 62. In this embodiment, the second mobile grating film 114 is applied over the second light source 112 and thus faces the second immobile grating film 108 applied over the second optical array sensor 104. The second light source 112 emits light (not shown) towards the second optical array sensor 104. The light transmits through the second mobile grating film 114, then through the second immobile grating film 108, and then to the second optical array sensor 104. Both the second immobile grating film 108 and the second mobile grating film 114 include a grid of lines 116, 118, respectively. At least either the grid of lines 116 of the second immobile grating film 114 or the grid of lines 118 of the second mobile grating film 114 are arranged vertically. In this embodiment, the grid of lines 116, 118 of both the second immobile grating film 108 and the second mobile grating film 114 are arranged vertically.

Figure 13:
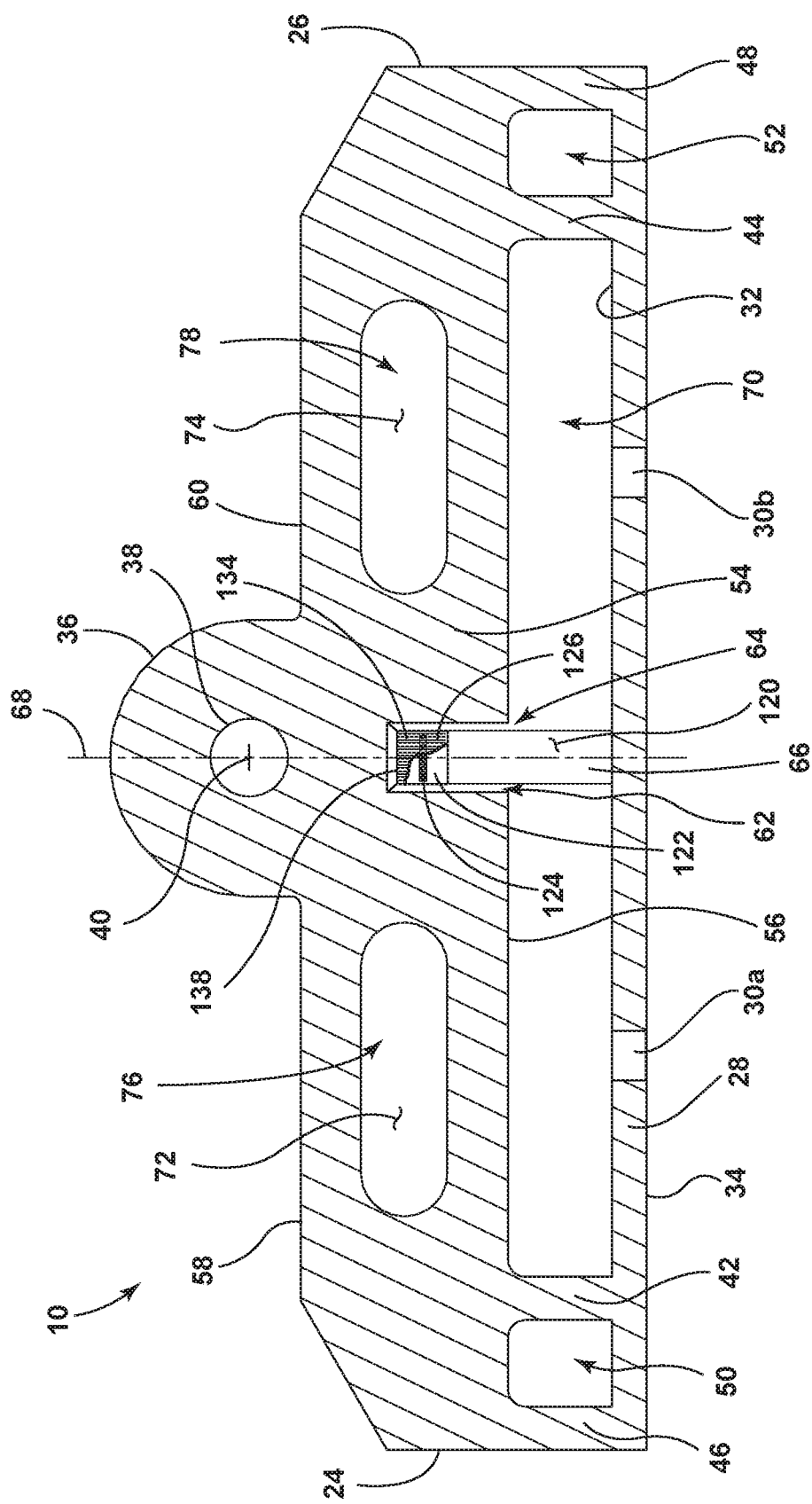
FIG. 13 is a side view of the cross-section of the load cell of FIG. 1 taken through XIII-XIII of FIG. 5, illustrating a third optical array sensor attached to a third surface of the post.

The post 66 further includes a third surface 120 (see particularly FIG. 13). The third surface 120 forms a plane parallel with the first surface 98 of the post 66. The third surface 120 is disposed on the opposite side of the post 66 as the first surface 98. The load cell 10 further includes a third optical array sensor 122. The third optical array sensor 122 is attached to the post 66 within the hollow interior section 62. In this embodiment, the third optical array sensor 122 is affixed to the third surface 120 of the post 66 and the third optical array sensor 122 includes an array of photodiodes 124 that are arranged horizontally. The load cell 10 further includes a third immobile grating film 126. The third immobile grating film 126 is applied over the third optical array sensor 122.

Figure 14:
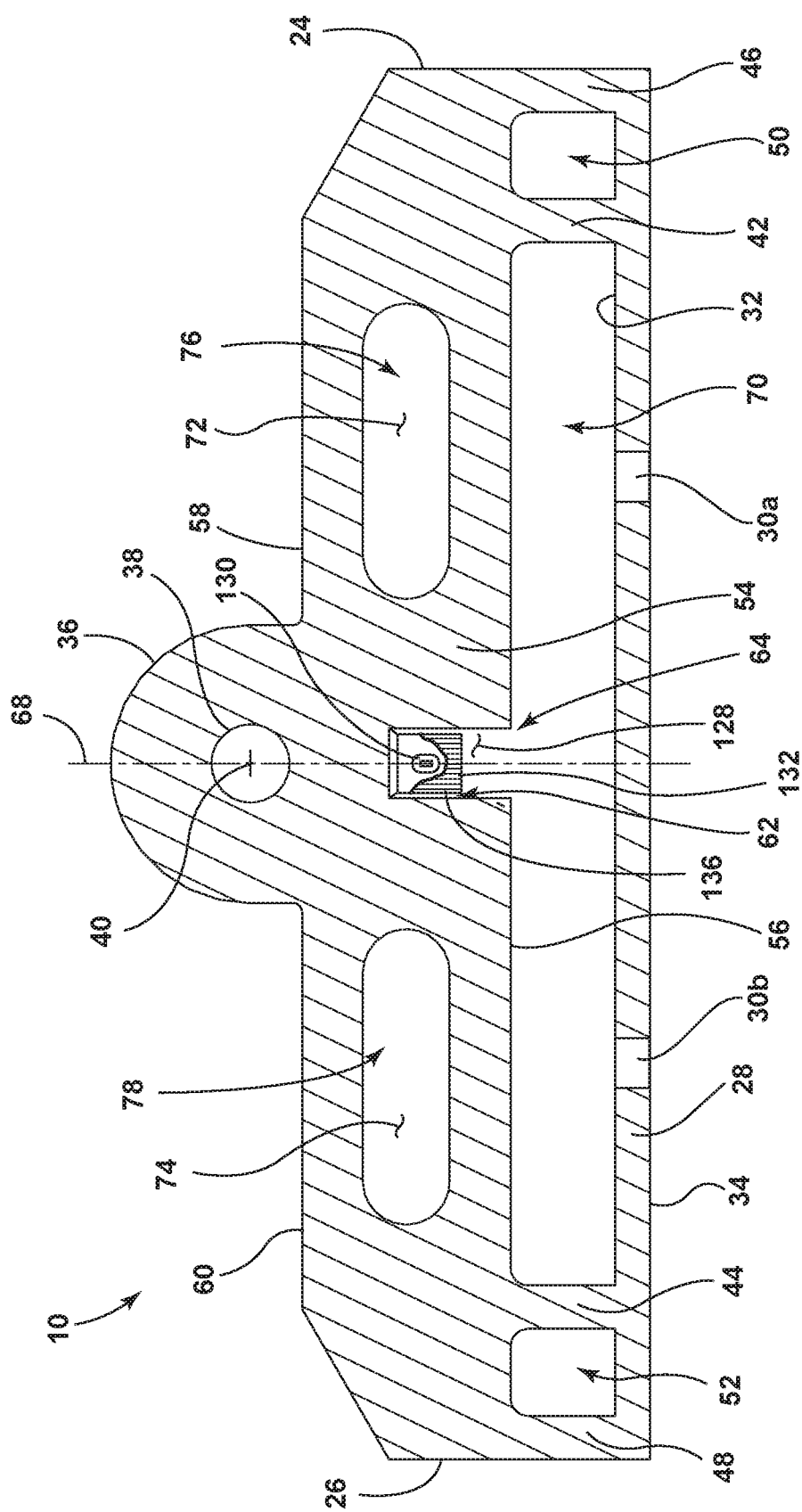
FIG. 14 is a side view of the cross-section of the load cell of FIG. 1 taken through XIV-XIV of FIG. 5, illustrating a third light source attached to a third surface of the middle portion.

The middle portion 54 further includes a third surface 128 (see particularly FIG. 14). The third surface 128 forms a plane parallel with the third surface 120 of the post 66. The third surface 128 is accessible from the hollow interior section 62. The third surface 128 of the middle portion 54 faces the third surface 120 of the post 66.

The load cell 10 further includes a third light source 130. The third light source 130 is disposed within the hollow interior section 62. In this embodiment, the third light source 130 is affixed to the third surface 128 of the middle portion 54. The load cell 10 further includes a third mobile grating film 132. The third mobile grating film 132 is interconnected with the middle portion 54 within the hollow interior section 62. In this embodiment, the third mobile grating film 132 is applied over the third light source 130 and thus the third immobile grating film 126 faces the third mobile grating film 132. The third light source 130 emits light that transmits through the third mobile grating film 132, then through the third immobile grating film 126, and then to the third optical array sensor 122. Both the third immobile grating film 126 and the third mobile grating film 132 include a grid of lines 134, 136, respectively. At least either the grid of lines 134 of the first immobile grating film 126 or the grid of lines 136 of the third mobile grating film 132 are arranged vertically. In this embodiment, both the grid of lines 134 of the third immobile grating film 126 and the grid of lines 136 of the third mobile grating film 132 are arranged vertically.

As explained above with the first optical array sensor 80, the second optical array sensor 104, and the third optical array sensor 122 all have photodiodes 82, 106, 124, respectively, that produce output voltages, as a function of the intensity of the light perceived, which changes as a function of the displacement of the middle portion 54 of the load cell 10 relative to the post 66. In this embodiment, the output voltages of the first optical array sensor 80 vary primarily as a function of the vertical displacement of the middle portion 54 relative to the post 66. Similarly, in this embodiment, the output voltages of the second optical array sensor 104 vary primarily as a function of lateral displacement of the middle portion 54 relative to the post 66. Finally, in this embodiment, the output voltages of the third optical array sensor 122 vary primarily as a function of longitudinal displacement of the middle portion 54 relative to the post 66.

In another embodiment, the first optical sensor array 80, the second optical sensor array 104, and the third optical sensor array 122, with the respective immobile grating films 84, 108, 126 applied over the sensor array as described above, are affixed as a pack to the top 138 of the post 66. In this embodiment, the arrays 80, 104, 122 all face in the same direction as described above, and receive light from the first light source 90, second light source 112, and third light source 130 respectively, after the emitted light transmits through the first mobile grating film 92, second mobile grating film 114, and third mobile grating film 132 as described above. In order to position the optical sensor arrays 80, 104, 122, light sources 90, 112, 130, and grating films 84, 92, 108, 114, 126, 132 to the post 66 or middle portion 54, as described above, the load cell 10 may be divided into two component parts, such as divided down the longitudinal midline 22 of the load cell 10, and then welded or otherwise combined into one rigid component load cell 10.

In the foregoing description, it will be readily appreciated by those skilled in the art that modifications may be made to the disclosed embodiments without departing from the concepts as disclosed herein.

The invention claimed is:

1. A load cell to measure displacements transferred by a fifth wheel to the load cell, comprising:
    an elongated mounting base portion configured to attach to a support structure of a tractor;
    a coupling portion configured to pivotally support the fifth wheel;
    a middle portion disposed above the elongated mounting base portion and below the coupling portion, the middle portion including a hollow interior section with an opening into the hollow interior section, wherein the mounting base portion, the coupling portion and the middle portion comprise the same material and are an integral, single piece; and
    a freestanding post extending from the elongated mounting base portion and protruding into the hollow interior section of the middle portion such that the freestanding post is spaced from both the coupling portion and the middle portion and does not contact either the coupling portion or the middle portion, wherein the freestanding post is configured to support a first optical array sensor, and wherein the freestanding post is configured to remain rigid along a length thereof in response to a load exerted on the coupling portion.

2. The load cell of claim 1, wherein the coupling portion includes an aperture with a centerline, and wherein the freestanding post is disposed between the centerline and the elongated mounting base portion.

3. The load cell of claim 2, wherein the hollow interior section is disposed between the centerline and the elongated mounting base portion.

4. The load cell of claim 2, wherein the freestanding post has a vertical centerline, and wherein the vertical centerline and the centerline of the aperture of the coupling portion intersect at an orthogonal angle.

5. The load cell of claim 4, further comprising:
    the first optical array sensor attached to the post within the hollow interior section.

6. The load cell of claim 5, further comprising:
    a first immobile grating film applied over the first optical array sensor.

7. The load cell of claim 6, further comprising:
    a first light source disposed within the hollow interior section.

8. The load cell of claim 7, further comprising:
    a first mobile grating film interconnected with the middle portion within the hollow interior section, wherein the first light source emits light that transmits through the first mobile grating film, then through the first immobile grating film, and then to the first optical array sensor.

9. The load cell of claim 8, wherein the freestanding post further includes a first surface forming a plane parallel with a longitudinal midline of the load cell, wherein the middle portion includes a first surface forming a plane parallel with a longitudinal midline of the load cell, accessible from the hollow interior section, and facing the first surface of the freestanding post, wherein the first optical array sensor is affixed to the first surface of the freestanding post, wherein the first light source is affixed to the first surface of the middle portion, and wherein the first immobile grating film faces the first mobile grating film.

10. The load cell of claim 9, wherein the first optical array sensor includes an array of photodiodes that are arranged vertically, and wherein both the first immobile grating film and the first mobile grating film include a grid of lines and at least either the grid of lines of the first immobile grating film or the grid of lines of the first mobile grating film are arranged horizontally.

11. The load cell of claim 10, further comprising:
a second optical array sensor attached to the post within the hollow interior section; and
a second immobile grating film applied over the second optical array sensor.

12. The load cell of claim 1, further comprising:
a first lateral side;
a second lateral side on the opposite side of the load cell as the first lateral side;
a first longitudinal side;
a second longitudinal side on the opposite side of the load cell as the first longitudinal side;
a first interior column near the first longitudinal side extending laterally from the first lateral side to the second lateral side and extending vertically upward from the elongated mounting base portion;
a second interior column near the second longitudinal side extending laterally from the first lateral side to the second lateral side and extending vertically upward from the elongated mounting base portion;
a middle void space extending from the first lateral side to the second lateral side, except for the post, and is disposed between the first interior column and the second interior column;
a first edge column, terminating with the first longitudinal side, disposed near the first interior column and extending laterally from the first lateral side to the second lateral side and extending vertically upward from the elongated mounting base portion;
a first edge void space extending from the first lateral side to the second lateral side and is disposed between the first edge column and the first interior column;
a second edge column terminating with the second longitudinal side, disposed near the second interior column and extending laterally from the first lateral side to the second lateral side and extending vertically upward from the elongated mounting base portion; and
a second edge void space extending from the first lateral side to the second lateral side and is disposed between the second edge column and the second interior column.

13. The load cell of claim 1, wherein the post is integral with the base mounting portion.

14. A load cell to measure displacements transferred by a fifth wheel to the load cell, comprising:
an elongated mounting base portion configured to attach to a support structure of a tractor;
a coupling portion configured to pivotally support the fifth wheel;
a middle portion disposed above the elongated mounting base portion and below the coupling portion, the middle portion including a hollow interior section with an opening into the hollow interior section; and
a post extending from the elongated mounting base portion and protruding into the hollow interior section of the middle portion;
a second optical array sensor attached to the post within the hollow interior section;
a second immobile grating film applied over the second optical array sensor;
a second light source disposed within the hollow interior section; and
a second mobile grating film interconnected with the middle portion within the hollow interior section, wherein the second light source emits light that transmits through the second mobile grating film, then through the second immobile grating film, and then to the second optical array sensor.

15. The load cell of claim 14, wherein the post further includes a second surface forming a plane parallel with the centerline of the aperture of the coupling portion, wherein the middle portion including a second surface forming a plane parallel with the centerline of the aperture of the coupling portion, accessible from the hollow interior section, and facing the second surface of the post, wherein the second optical array sensor is affixed to the second surface of the post, wherein the second light source is affixed to the second surface of the middle portion, and wherein the second immobile grating film faces the second mobile grating film.

16. The load cell of claim 15, wherein the second optical array sensor includes an array of photodiodes that are arranged laterally, and wherein both the second immobile grating film and the second mobile grating film include a grid of lines and at least either the grid of lines of the second immobile grating film or the grid of lines of the second mobile grating film are arranged vertically.

17. The load cell of claim 16, further comprising:
a third optical array sensor attached to the post within the hollow interior section; and
a third immobile grating film applied over the third optical array sensor.

18. The load cell of claim 17, further comprising:
a third light source disposed within the hollow interior section; and
a third mobile grating film interconnected with the middle portion within the hollow interior section, wherein the third light source emits light that transmits through the third mobile grating film, then through the third immobile grating film, and then to the third optical array sensor.

19. The load cell of claim 18, wherein the post further includes a third surface forming a plane parallel with the first surface of the post and with the longitudinal midline of the load cell and disposed on the opposite side of the post as the first surface, wherein the middle portion including a third surface forming a plane parallel with the third surface of the post, accessible from the hollow interior section, and facing the third surface of the post, wherein the third optical array sensor is affixed to the third surface of the post, wherein the third light source is affixed to the third surface of the middle portion, and wherein the third immobile grating film faces the third mobile grating film.

20. The load cell of claim 19, wherein the third optical array sensor includes an array of sensors that are arranged horizontally, and wherein both the third immobile grating film and the third mobile grating film include a grid of lines and at least either the grid of lines of the first immobile grating film or the grid of lines of the third mobile grating film are arranged vertically.

21. The load cell of claim 20, wherein the first optical array sensor, the second optical array sensor, and the third optical array sensor all produce output voltages, wherein the output voltages of the first optical array sensor vary primarily as a function of vertical displacement of the middle portion relative to the post, wherein the output voltages of the second optical array sensor vary primarily as a function of lateral displacement of the middle portion relative to the post, and wherein the output voltages of the third optical array sensor vary primarily as a function of longitudinal displacement of the middle portion relative to the post.

22. A load cell to measure displacements transferred by a fifth wheel to the load cell, comprising:
- a mounting base portion configured to attach to a support structure of a tractor;
- a coupling portion configured to pivotally support the fifth wheel;
- a middle portion disposed above the elongated mounting base portion and below the coupling portion, the middle portion including a hollow interior section, wherein the mounting base portion, the coupling portion and the middle portion comprise the same material and are an integral, single piece;
- a freestanding post protruding into the hollow interior section of the middle portion such that the freestanding post is spaced from both the coupling portion and the middle portion and does not contact either the coupling portion or the middle portion, and wherein the freestanding post is configured to remain rigid along a length thereof in response to a load exerted on the coupling portion;
- a first optical array sensor positioned on a first surface of the freestanding post between the mounting base portion and the coupling portion;
- a first immobile grating film applied over the first optical array sensor;
- a first light source;
- a first mobile grating film interconnected with the middle portion, wherein the first light source emits light that transmits through the first mobile grating film, then through the first immobile grating film, and then to the first optical array sensor; and
- a second optical array sensor located on a second surface and arranged substantially orthogonally with respect to the first optical array sensor.

23. The load cell of claim 22, wherein the first optical array sensor includes an array of photodiodes that are arranged vertically, and wherein, both the first immobile grating film and the first mobile grating film include a grid of lines and at least either the grid of lines of the first immobile grating film or the grid of lines of the first mobile grating film are arranged horizontally.

24. The load cell of claim 23, further comprising:
- a second immobile grating film applied over the second optical array sensor;
- a second light source; and
- a second mobile grating film interconnected with the middle portion within the hollow interior section, wherein the second light source emits light that transmits through the second mobile grating film, then through the second immobile grating film, and then to the second optical array sensor.

25. The load cell of claim 24, wherein the second optical array sensor includes an array of photodiodes that are arranged laterally, and wherein both the second immobile grating film and the second mobile grating film include a grid of lines and at least either the grid of lines of the second immobile grating film or the grid of lines of the second mobile grating film are arranged vertically.

26. The load cell of claim 25, further comprising:
- a third optical array sensor positioned between the mounting base and the coupling portion;
- a third immobile grating film applied over the third optical array sensor;
- a third light source; and
- a third mobile grating film interconnected with the middle portion, wherein the third light source emits light that transmits through the third mobile grating film, then through the third immobile grating film, and then to the third optical array sensor.

27. The load cell of claim 26, wherein the third optical array sensor includes an array of sensors that are arranged horizontally, and wherein both the third immobile grating film and the third mobile grating film include a grid of lines and at least either the grid of lines of the first immobile grating film or the grid of lines of the third mobile grating film are arranged vertically.

* * * * *

UNITED STATES PATENT AND TRADEMARK OFFICE
CERTIFICATE OF CORRECTION

PATENT NO. : 11,428,589 B2
APPLICATION NO. : 16/160452
DATED : August 30, 2022
INVENTOR(S) : Schutt It is certified that error appears in the above-identified patent and that said Letters Patent is hereby corrected as shown below:

In the Specification

Column 2, Line 32:
"show" should be – shown –

Column 2, Line 48:
After "is" insert -- a --

Column 2, Line 49:
"lines" should be – line –

Column 2, Line 52:
"lines" should be – line –

Column 2, Line 55:
After "through" insert -- line --

Column 2, Line 65:
"lines" should be – line –

Column 3, Line 2:
"lines" should be – line –

Column 3, Line 6:
After "through" insert -- line --

Column 3, Line 10:
After "through" insert -- line --

Signed and Sealed this
Fourth Day of April, 2023

Katherine Kelly Vidal
*Director of the United States Patent and Trademark Office*

CERTIFICATE OF CORRECTION (continued)
U.S. Pat. No. 11,428,589 B2

Column 6, Line 29:
"photo diodes, phot resistive" should be – photodiodes, photo resistive –

In the Claims

Column 11, Claim 12, Lines 31, 40, 48:
Delete "is"

Column 11, Claim 14, Line 59:
Before "a middle portion" insert a tab

Column 11, Claim 14, Line 62:
Delete "and"

Column 13, Claim 23, Line 43:
After "wherein" delete ","